US011959602B1

(12) United States Patent
Mckay et al.

(10) Patent No.: US 11,959,602 B1
(45) Date of Patent: Apr. 16, 2024

(54) ENCAPSULATED LINEAR LIGHTING WITH PARTIALLY ENCAPSULATED CONNECTORS

(71) Applicant: Elemental LED, Inc., Reno, NV (US)

(72) Inventors: Brian Mckay, Reno, NV (US); Paulo Dacia, Reno, NV (US)

(73) Assignee: Elemental LED, Inc., Reno, NV (US)

( * ) Notice: Subject to any disclaimer, the term of this patent is extended or adjusted under 35 U.S.C. 154(b) by 0 days.

(21) Appl. No.: 18/164,241

(22) Filed: Feb. 3, 2023

(51) Int. Cl.

| | |
|---|---|
| ***F21S 4/24*** | (2016.01) |
| ***F21V 23/06*** | (2006.01) |
| ***F21Y 103/10*** | (2016.01) |
| ***F21Y 115/10*** | (2016.01) |

(52) U.S. Cl.
CPC ................ *F21S 4/24* (2016.01); *F21V 23/06* (2013.01); *F21Y 2103/10* (2016.08); *F21Y 2115/10* (2016.08)

(58) Field of Classification Search
CPC .......... F21S 4/24; F21V 23/06; F21Y 2103/10
See application file for complete search history.

(56) References Cited

U.S. PATENT DOCUMENTS 8,262,250 B2 * 9/2012 Li ............................ F21S 4/24 362/249.02
10,520,143 B1 12/2019 Findlay et al.
10,753,596 B1 8/2020 Lopez-Martinez et al.
10,801,716 B1 10/2020 Lopez-Martinez et al.

OTHER PUBLICATIONS

U.S. Appl. No. 17/412,951, filed Aug. 26, 2021, Brian McKay, Entire document.
U.S. Appl. No. 17/732,760, filed Apr. 29, 2022, Travis Irons, Entire document.

* cited by examiner

*Primary Examiner* — Karabi Guharay
(74) *Attorney, Agent, or Firm* — United IP Counselors, LLC

(57) ABSTRACT

A strip of encapsulated linear lighting with a partially encapsulated electrical connector is disclosed, as are processes for manufacturing such strips of encapsulated linear lighting. In these processes, connecting structure is connected to a strip of linear lighting. A portion of the connecting structure is then sheathed in a stopper. The stopper is used to dam a vessel or channel, the dammed vessel or channel is filled with resin, and the resin is caused or allowed to cure. The stopper protects the connecting structure from resin during the encapsulation process and leaves its contacts unencapsulated and exposed. The connecting structure can be connected to external structures, like a power cable or another segment of encapsulated linear lighting, after manufacture. A joint between the connecting structure and another structure can be overmolded or otherwise protected.

9 Claims, 12 Drawing Sheets

ENCAPSULATED LINEAR LIGHTING WITH PARTIALLY ENCAPSULATED CONNECTORS

TECHNICAL FIELD

The invention relates to encapsulated linear lighting.

BACKGROUND

Linear lighting is a particular class of solid-state lighting in which a long, narrow printed circuit board (PCB) is populated with a number of light-emitting diode (LED) light engines, usually spaced apart at a regular spacing or pitch. Each LED light engine includes one or more LEDs, packaged with all elements necessary for mounting on the PCB. Depending on the embodiment, the PCB may be flexible or rigid. Flexible PCB, made of a polymeric material such as a polyester or a polyimide, is particularly popular. In many cases, linear lighting with a flexible PCB is made in repeating blocks, so that it can be cut to any desired length in the field. Strips of flexible PCB are often joined at overlapping solder joints to make linear lighting of arbitrarily long length.

Because linear lighting is a microelectronic circuit on a printed circuit board, it is susceptible to environmental contaminants and hazards, including water, dust, dirt, and electrostatic discharge. In order to increase its robustness and to provide a greater deal of ingress protection, linear lighting is frequently encased in or encapsulated with polymers such as polyurethanes and silicones. The casing or covering can also be useful in modifying the emitted light, e.g., by diffusing it.

When the expected environmental conditions are not too severe, linear lighting may simply be placed in an extruded covering and the ends of the covering sealed, as in the simulated neon of U.S. Pat. No. 10,520,143. However, the most robust encapsulations are those produced by pouring a low-viscosity polymeric resin over the linear lighting and allowing it to cure. U.S. Pat. Nos. 10,753,596 and 10,801,716, both of which are incorporated by reference herein in their entireties, disclose processes for pour-over encapsulation of linear lighting using stoppers to temporarily dam the channel into which the resin is poured, thereby offering better control over the processes. U.S. Pat. No. 11,098,887 discloses a variation on this concept, allowing the encapsulated final product to bend in a different plane.

To function, linear lighting must be connected to power in some way. In pour-over encapsulation processes, the typical method for connecting to power involves soldering the linear lighting PCB to the conductors of a power cable prior to encapsulation. Typically, at least a short length of the power cable is included in the encapsulation. However, this process has drawbacks, among them that the type and length of cable must be known prior to the start of the encapsulation process. Additionally, because the linear lighting begins the encapsulation process attached to a cable, that cable must be accommodated throughout the process, potentially taking up space in the encapsulation machine and thus reducing manufacturing throughput. Better processes for making power connections in encapsulated lighting could create greater flexibility in manufacturing processes and allow for higher production throughput.

BRIEF SUMMARY

One aspect of the invention relates to a strip of encapsulated linear lighting having a partially encapsulated electrical connector protruding therefrom. The partially encapsulated electrical connector may comprise, for example, a pin connector. The partially encapsulated electrical connector allows one to make electrical connections with the strip of encapsulated linear lighting after the encapsulation process is complete, eliminates the need to know before manufacturing what length and type of cable is to be attached to an encapsulated strip of linear lighting, and eliminates the need to accommodate a cable during manufacturing.

Another aspect of the invention relates to processes for producing an encapsulated strip of linear lighting with a partially encapsulated connector, and to encapsulated strips of linear lighting produced according to these processes. In one process, connecting structure is attached to a strip of linear lighting, for example, by soldering the connecting structure to solder pads provided on or in the strip of linear lighting. A portion of the connecting structure is then sheathed in a stopper to protect it from resin during the encapsulation, and that stopper is used to dam a vessel in which the strip of linear lighting is installed. The dammed vessel is then filled with resin to encapsulate the strip of linear lighting, and the resin is caused or allowed to cure. In many cases, the vessel is a channel, and a second stopper is installed at a position spaced from the stopper in which the portion of the connecting structure is sheathed.

Yet another aspect of the invention relates to a process for overmolding an unencapsulated connection between an encapsulated strip of linear lighting and a connected external structure, such as a power cord. The process comprises placing an assembly comprising placing a portion of an encapsulated strip of linear lighting, a portion of the connected external structure and the connection in a mold that seals against the encapsulated strip of linear lighting and the connected external structure and defines a cavity around the connection, filling the cavity with a resin, and causing or allowing the resin to cure.

Further aspects of the invention relate to more advanced processes for manufacturing encapsulated linear lighting with electrical connectors. In one such process, a length of linear lighting is cut and prepared for encapsulation. At least a portion of that length of linear lighting is installed in a channel, and a connector is connected to it. A portion of the connector is sheathed in a first stopper. The first stopper is installed in the channel in a first position, and a second stopper is installed in a second position spaced from the first position to dam a segment of the channel. The dammed segment is filled with resin, and the resin is caused or allowed to cure. After the dammed segment is cured, if necessary, another length of the linear lighting is installed in the channel. At least the second stopper is removed and placed in a position spaced from its previous position or, alternatively, another stopper is placed in a position spaced from the original position of the second stopper to define a second segment. The second segment is then filled with resin and the resin is caused or allowed to cure. This process of defining segments and filling them continues until the entire length of the linear lighting is encapsulated. As needed, additional pieces of channel are placed so as to abut the end of the previous piece of channel. This process, and processes like it, allow long lengths of encapsulated linear lighting to be prepared without knowing beforehand the nature and length of a power cord or cable, and without having to accommodate the power cord or cable during the manufacturing process.

Other aspects, features, and advantages of the invention will be set forth in the following description.

BRIEF DESCRIPTION OF THE DRAWING FIGURES

The invention will be described with respect to the following drawing figures, in which like numerals represent like features throughout the description, and in which.

Figure 10:
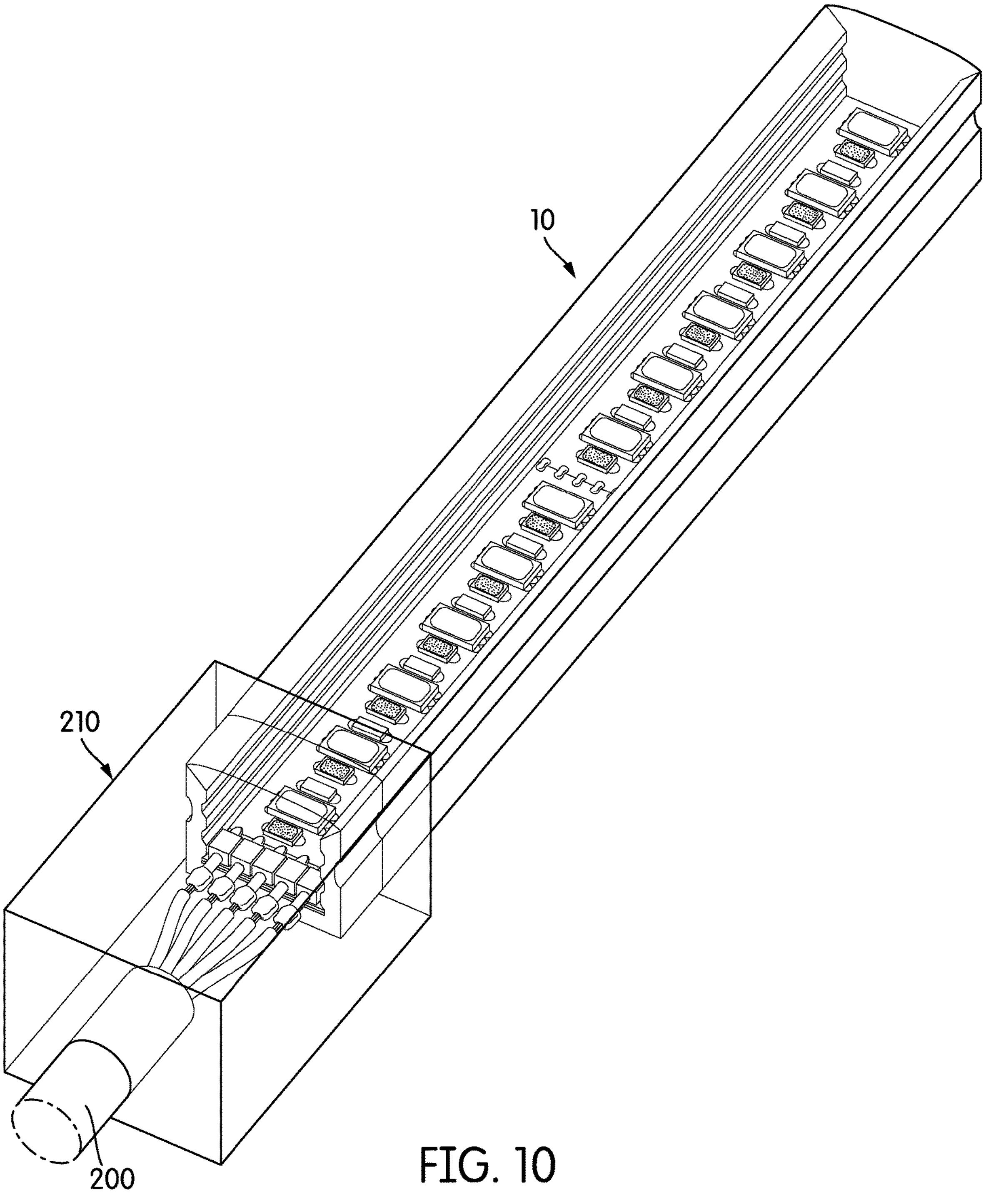
Figure 11:
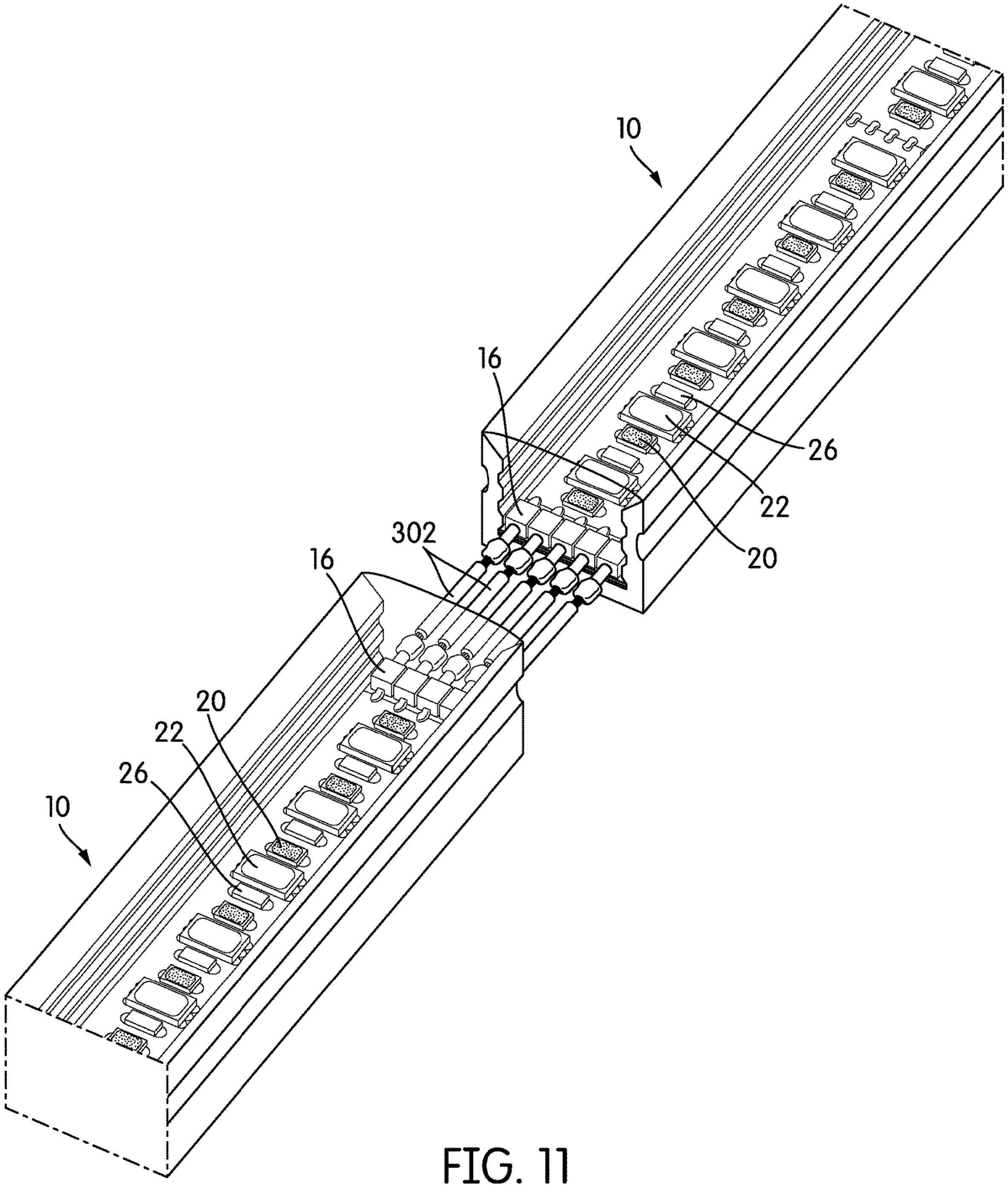

FIG. 10 is a perspective view of the strip of encapsulated linear lighting in isolation with an overmold protecting the connection between the partially encapsulated connector and the conductors of the cable; and FIG. 11 is a perspective view illustrating an alternate arrangement in which two separate strips of encapsulated linear lighting with partially-encapsulated connectors are connected end-to-end.

DETAILED DESCRIPTION

Figure 1:
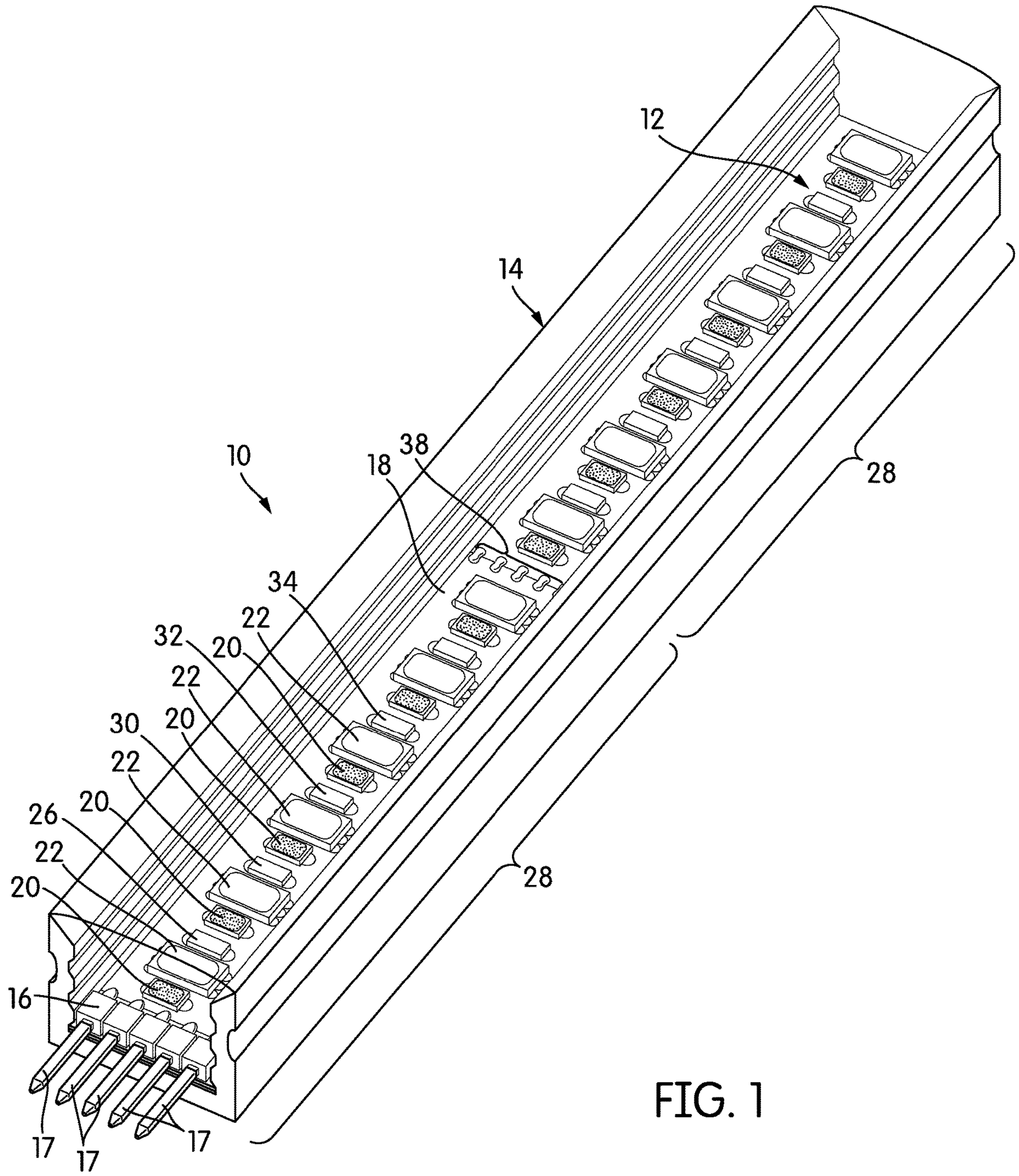
FIG. 1 is a perspective view of a strip of encapsulated linear lighting with a partially encapsulated pin connector.

FIG. 1 is a perspective view of a strip of encapsulated linear lighting, generally indicated at 10, according to one embodiment of the invention. Generally speaking, the linear lighting 10 includes a strip of linear lighting 12 and an encapsulation or covering 14. Partially encapsulated within the covering 14 and extending from one end of the encapsulated strip of linear lighting 10 is a header or connector 16. In this embodiment, the connector 16 is a pin connector 16 with five pins 17.

The term "connector," as used here, refers generally to any structure or structures that can be attached or connected to the strip of linear lighting 12 to facilitate electrical and, in some cases, mechanical connection. This may include individual pins, as well as connectors of other types. The nature of the connector 16 will vary with the type and features of the strip of linear lighting 12, as will be described below in more detail.

The strip of linear lighting 12 itself may be of any type and have any features. As was noted above, a strip of linear lighting 12 typically includes a long, narrow printed circuit board (PCB) 18 on which a number of LED light engines is disposed, each spaced from the others at a regular spacing or pitch. The PCB 18 may be flexible, made of a polyester, like biaxially-oriented polyethylene terephthalate (BoPET; MYLAR®), or a polyimide, or it may be rigid, made of a material like FR4 composite, metal, or ceramic. The strip of linear lighting 12 may comprise a single, continuous length of PCB 18, or it may comprise multiple lengths of PCB 18 within the same covering 14. The width of the PCB 18 is not critical and, in typical embodiments, ranges from 5-14 mm, although both narrower and wider PCB 18 can be used.

The strip of linear lighting 12 may have one or multiple series of LED light engines disposed on it. In the simplest embodiments, the LED light engines may all be of the same type; however, strips of linear lighting 12 according to embodiments of the invention may have multiple series of LED light engines of different types. In the illustrated embodiment, the strip of linear lighting 12 has two different types of LED light engines 20, 22 disposed on it. One series of LED light engines 22 is of the RGB type, meaning that each light engine has at least one red, one blue, and one green LED, and those LEDs can be independently controlled to be lit in various combinations and at various relative intensities to generate a number of different colors. Another series of LED light engines 20 is of the blue-pump variety: an internal blue LED or LEDs are topped by a phosphor, a chemical compound or mix that absorbs the emitted blue light and converts it into a broader or different spectrum. Blue-pump LED light engines 20 are most often used to generate "white" light, which, as those of skill in the art would understand, has a spectrum containing a broad range of light wavelengths. The phosphor may be chosen to give the emitted light any desired color temperature. Color temperatures in the range of 2400K to 6000K are common in interior lighting.

The electrical configuration of a PCB 18 for a strip of linear lighting 12 may vary considerably from embodiment to embodiment and application to application. Most commonly, LED light engines 20, 22 and other components are surface-mounted on the PCB 18, although through-hole mounting and other forms of mounting may also be used, particularly with rigid PCBs. Usually, the PCB 18 includes an upper layer on which components are mounted and a lower layer that includes conductors to convey power and signals.

In addition to the LED light engines 20, 22, PCBs 18 can and frequently do include other components. For example, LEDs are diodes, and have the voltage-current characteristics of those components. Once a diode is forward biased by an applied voltage, its resistance to the flow of current drops considerably, and the current that flows in the circuit can thus increase to the point of causing damage to the components. For that reason, PCBs 18 will often include components like resistors 26 or current-controlling driver integrated circuits (ICs) to set and manage the flow of current in the circuit. This type of linear lighting is known as "constant voltage" linear lighting because the presence of current-setting components 26 on the PCB 18 allow it to be provided with power at a constant voltage and a varying current. Alternatively, particularly when the length and power needs of the linear lighting are known in advance, the current in the circuit may be regulated by the power supply, and the PCB 18 may not include much more than the LED light engines 20, 22 themselves. This type of linear lighting is known as "constant current" linear lighting, because it is supplied with a constant current (or a current that varies within a narrow range) at a variable voltage. Both types of linear lighting may be encapsulated.

Particularly in the case of a flexible PCB 18 that is designed as constant voltage linear lighting, the PCB 18 may be arranged in repeating blocks. In this arrangement, each repeating block contains a number of LED light engines 20, 22 and whatever other components are necessary to drive the LED light engines 20, 22 (here, the term "drive" is a general one that refers to anything necessary to power and control the LED light engines 20, 22). When repeating blocks are present, each repeating block is a complete lighting circuit that will light when connected to power. A PCB 18 may include any number of repeating blocks, which are physically in series with each other along the PCB 18, but are electrically arranged in parallel with each other, such that, ideally, each repeating block sees the same input voltage. (Over long lengths, the inherent resistances of the conductors in the PCB 18 will cause some drop in the voltage seen repeating blocks that are farther from the power source, a phenomenon known as Ohmic voltage drop.) In some cases, the PCB 18 may indicate boundaries between repeating blocks, e.g., by screen printing, at which the PCB 18 can be cut. If no explicit boundaries are indicated on the PCB 18, they may be discerned from landmarks on the PCB 18. Linear lighting 12 with a flexible PCB 18 arranged in repeating blocks is particularly convenient, because this type of linear lighting 12 can be made in arbitrarily long lengths and cut to essentially any desired length for encapsulation.

In the embodiment of FIG. 1, two repeating blocks 28 are shown. Each repeating block 28 includes six RGB LED light engines 22 and six blue-pump LED light engines 20. Each series of LED light engines 20, 22 is spaced from the others of its series at a regular pitch, but the two series of LED light engines 20, 22 are arranged on the PCB 18 such that a blue-pump LED light engine 20 is immediately adjacent to an RGB LED light engine 22. There are essentially four separate, cooperating lighting circuits on the PCB 18: the red, green, and blue LEDs within each of the RGB LED light engines 22 are independently controlled, as are the blue LEDs within the blue-pump LED light engines. A current-setting, surface-mounted resistor 26, 30, 32, 34 is provided for each channel (red, green, blue, and blue-pump/white), meaning that there are four resistors 26, 30, 32, 34 in each repeating block 28, each disposed in the interstitial space between LED light engines 20, 22. Because each type of LED may have a different forward voltage and require a different amount of current, each resistor 26, 30 32, 34 may have a different resistance. As those of skill in the art will note, there may be more resistors in the circuit: any resistance may be divided between two or more resistors in series, and in some cases, it may be helpful to include two resistors instead of one. For example, more resistors may help to dissipate heat or to distribute "hot spots" more evenly across the PCB 18. The physical arrangement of the resistors 26, 30, 32, 34 on the PCB 18 is not critical; they may be positioned to the sides of the PCB 18, for example, rather than being centered The arrangement of the strip of linear lighting 12 of FIG. 1 requires four independent signal terminals (red, green, blue, and blue-pump/white), plus a common anode or cathode, for a total of five terminals. The PCB 18 thus includes a set of solder pads 38 with five terminals in each repeating block. The solder pads 38 are areas where the upper layer of the PCB 18 has been removed to expose portions of the lower-layer conductors. (The solder pads 38 also serve as the boundary and dividing line between one repeating block 28 and the next.)

The strip of linear lighting 12 is thus of moderate complexity. More complex strips of linear lighting could include more types or series of LED light engines and would require more connections. For example, a second series of blue-pump LED light engines with a different phosphor, and thus, a different color temperature, could be included, potentially necessitating an additional signal terminal. However, the processes described here for creating an encapsulated strip of linear lighting 10 are not necessarily dependent on the complexity of the strip of linear lighting 12 or its PCB 18.

Moreover, while this description focuses on a strip of linear lighting 12 that is comprised of a long, narrow PCB 18, that need not be the case in all embodiments. The linear lighting may be structured differently in some embodiments. In some embodiments, rather than a single, continuous PCB, the linear lighting may comprise a number of small LED modules connected together in a long string by flexible conductors, such as wires or wire ropes. The individual LED modules may include small PCBs, such as FR4 PCBs. This type of linear lighting may also be encapsulated using the processes described here.

Figure 2A:
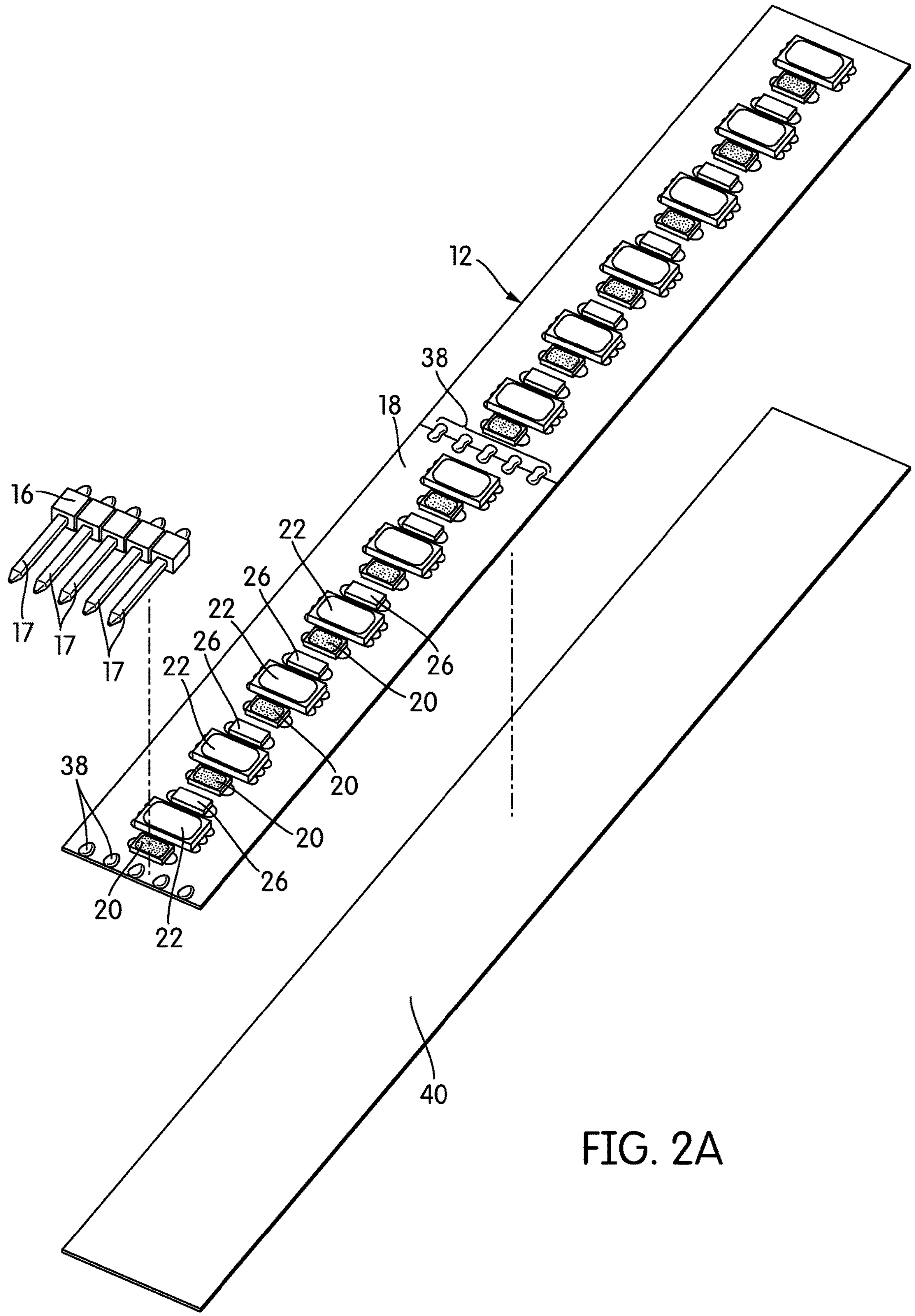
FIGS. 2A-2C are a series of exploded perspective views, illustrating the assembly of the parts of the strip of encapsulated linear lighting and the tasks involved in preparing a strip of linear lighting for encapsulation.
Figure 2B:
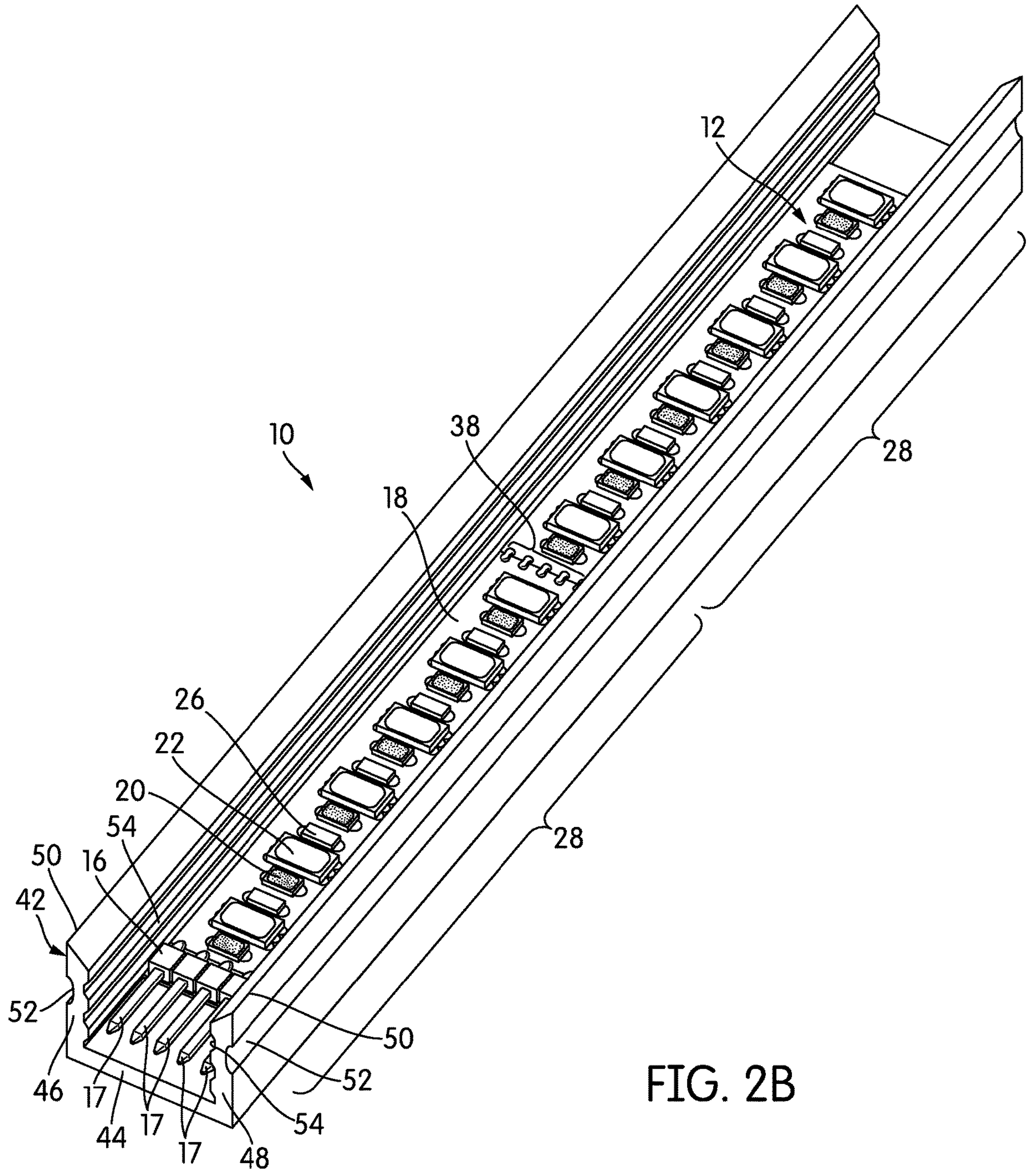
Figure 2C:
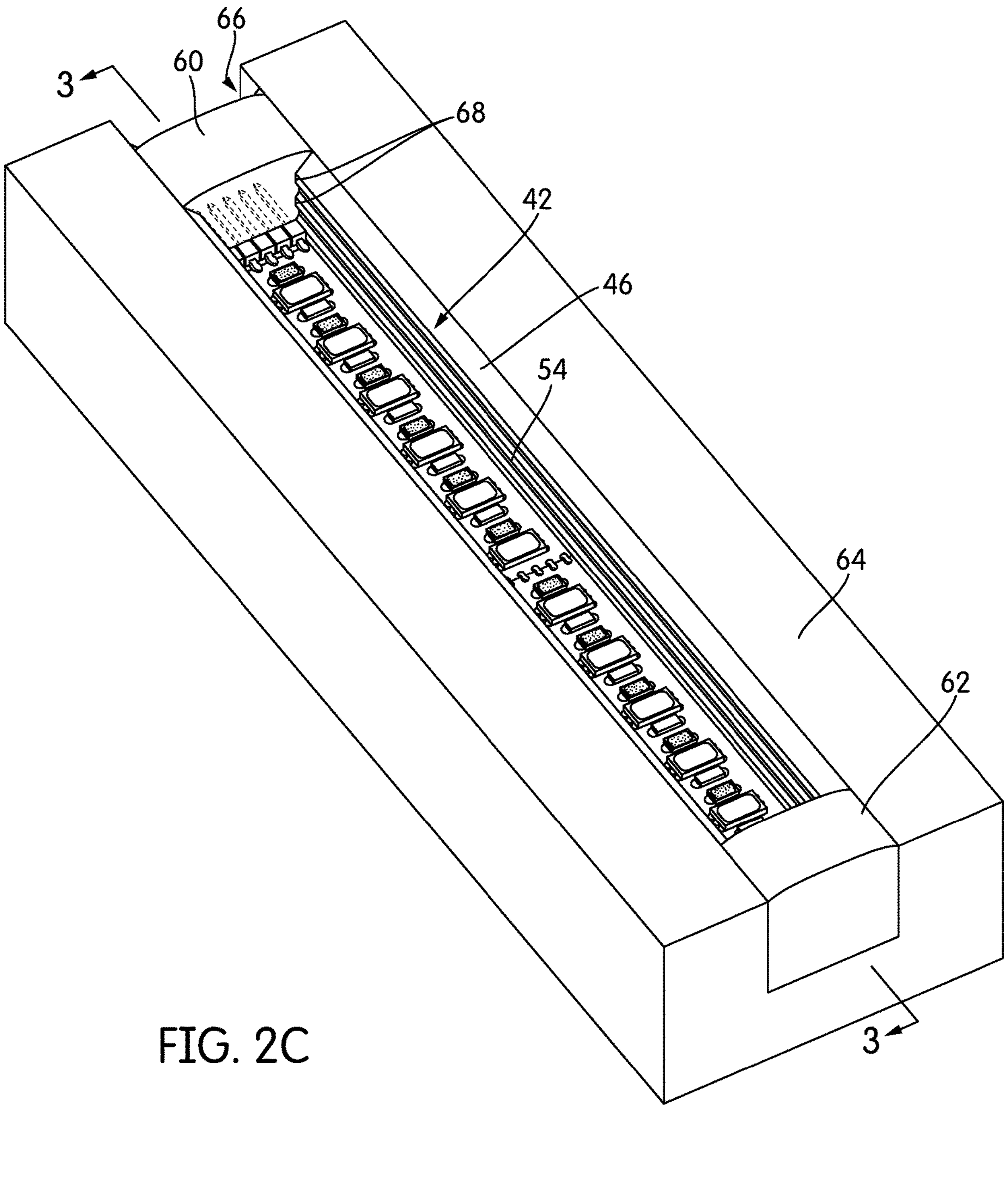

FIGS. 2A-2C are perspective and exploded perspective views showing the basic tasks involved in preparing a strip of linear lighting 12 for encapsulation. Those tasks will be explained with respect to FIGS. 2A-2C and summarized below with respect to a flow diagram. The remainder of this description will assume that the PCB 18 is flexible, arranged in repeating blocks 28, and cuttable to a particular length by cutting at cut points between adjacent repeating blocks 28. However, in other embodiments, the PCB 18 may be rigid.

Typically, the first task in manufacturing encapsulated linear lighting 10 is cutting a strip of linear lighting 12 to the desired length. As those of skill in the art will understand, the strip of linear lighting 12 can usually only be cut in a length that equates to a whole number of repeating blocks. For example, if one repeating block 28 is two inches (5 cm) long, the cut length of the strip of linear lighting 12 can only be a multiple of two inches (5 cm) if it is to function. Usually, one cuts a strip of linear lighting 12 to a length that is as close to the desired finished length of the encapsulated linear lighting 10 as possible without going over. The covering 14 usually adds at least a few millimeters of length at each end, in order to ensure that both ends of the encapsulated linear lighting 10 are sealed.

Once an appropriate length of linear lighting 12 is cut, it is prepared for encapsulation. This may involve one or several tasks. FIG. 2A is an exploded perspective view illustrating the initial preparation. Specifically, the connector 16 is connected to the solder pads 38 of the PCB 18. This is usually done by soldering, and if done by soldering, the connector 16 may be manually soldered to the solder pads 38 or it may be automatically soldered by an appropriate machine. The gauge or thickness of the pins 17 of the connector 16 will depend on the required ampacity and other conventional factors. As was noted briefly above, the connector 16 includes five pins 17 joined together; however, individual pins may be used in other embodiments. In some cases, conductive adhesives or other means of mechanical and electrical connection may be used to connect the connector to the solder pads 38.

FIG. 2A also illustrates an optional component that may be added in some embodiments. Specifically, the strip of linear lighting 12 may be bonded or otherwise secured to a reinforcing member 40 that is flexible in one plane or dimension but less flexible or inflexible in other planes or dimensions. The reinforcing member may be, e.g. a thin piece of plastic, such as polyethylene terephthalate (PET). For example, depending on the width of the PCB 18, the reinforcing member 40 may be a strip of PET that is either 6 or 12 mm (0.24 to 0.47 in) in width and 0.33 mm (0.0125 in) in thickness. The purpose of the reinforcing member 40 is to prevent the finished encapsulated linear lighting 10 from flexing in a direction that is damaging to the PCB 18, while allowing it to flex in a particular direction or directions. Reinforcing members and their use are described in greater length in U.S. Pat. No. 10,520,143, the contents of which are incorporated by reference herein in their entirety. In a typical case, the PCB 18 is backed with pressure-sensitive adhesive, and that pressure-sensitive adhesive is used to attach the PCB 18 to the reinforcing member 40.

The next task involved in the encapsulation is shown in FIG. 2B, a perspective view. Once the strip of linear lighting 12 is connected to the connector 16 and, if desired, prepared with a reinforcing member 40, it is placed in a channel 42 for encapsulation. This can be done with an appropriate double-sided, pressure-sensitive adhesive tape applied to the underside of the reinforcing member 40. Any pressure-sensitive adhesives that are used should be appropriately rated for heat tolerance and other environmental conditions that will be encountered by the encapsulated linear lighting 10.

The channel 42 has a bottom 44 and two generally parallel sidewalls 46, 48 that arise from opposite sides of the bottom 44, giving the channel 42 a U-shaped or cup-shaped cross-section. The channel 42 is open at the ends and along its top. This basic shape is all that is required of a channel 42—it serves as something that can contain liquid resin until it has cured and becomes a part of the covering 14. A channel 42 may also have or contain any features helpful in the manufacture or final use of a strip of encapsulated linear lighting 10. The particular channel shown in FIG. 2A includes angled, sharp upper edges 50 that may help to manage the meniscus of the poured resin and produce a cleaner upper emitting surface for the covering 14. On each of the sidewalls 46, 48, there is a roughly half-oval indented strip 52 that receives and seats a mounting clip to mount the encapsulated linear lighting 10. On the interior face of each sidewall 46, 48, there are a series of grooves 54.

Some of the features of the channel 42 may serve a function only during the manufacturing of encapsulated linear lighting 10, with no function in the final product. The grooves 54 are a good example of this. During manufacturing, the grooves 54 may allow a stopper with corresponding structure to make a better seal with the sidewalls 46, 48 of the channel 42 so as to contain liquid resin, as will be described below in more detail. However, in the final product, the grooves 54 will be filled in with resin. They serve no purpose in the final encapsulated linear lighting 10.

The manufacturing of channel 42 is described in detail in U.S. Pat. Nos. 10,753,596 and 10,801,716, and the process described in those patents applies here as well. Briefly, the channel 42 may be extruded plastic or metal, or it may be made by the same kind of poured-resin casting that is used to encapsulate the strip of linear lighting 12. In a poured-resin casting of the channel 42, a master tool would be made, typically in metal, with the desired shape and characteristics of the channel 42. A molding compound, like a silicone polymer resin, would be poured on or in the master tool and allowed to cure to create a mold. The mold would then be removed from the master tool and resin poured into it and cured to make the channel 42. The material of which the mold is made is not critical, so long as the resin used to make the channel 42 will not stick to it.

If the channel 42 is made by resin casting, it may be made of the same base resin as the rest of the covering 14, optionally with different additives. For example, the channel 42 is often colored white to aid in reflection of any light that might be internally reflected at the boundary of the covering 14. If the channel 42 is a polymer extrusion, it would typically be made of a thermoplastic polymer that is at least compatible with the polymer used as the filling resin. For example, if the resin used as the filling is a thermoset polyurethane, the resin used for the channel 42 may be a thermoplastic polyurethane to which the filling resin will adhere.

It should be understood that while the channel 42 has certain features, as was noted above, any vessel that can contain liquid resin for long enough to cure can be used as a channel in embodiments of the present invention. The channel 42 may be particularly suitable for a flexible encapsulation, but there are applications in which a metal extrusion, such as an aluminum or steel extrusion, may be useful as a channel. The vessel used in the encapsulation could also be square or circular, for example, with multiple strips of linear lighting placed side-by-side.

FIG. 2C illustrates the next preparatory step: the channel 42 is dammed with stoppers 60, 62 and, optionally, placed in a carrier 64. For descriptive purposes, the stopper 60 at the head end of the channel 42 is referred to as the proximal stopper in this description, while the other stopper 62 is referred to as the distal stopper. The stoppers 60, 62 are made of a compliant material that will make a seal against the channel 42 and will not adhere to the resin used to fill the channel 42. For example, if the filling resin is polyurethane, the stoppers 60, 62 may be made of a silicone polymer. Typically, the stoppers 60, 62 themselves are made by pouring stopper material into an empty channel 42, so that the stoppers 60, 62 assume its negative shape, and then cutting the strip of cured stopper material into stoppers 60, 62 of appropriate length. However, many variations on this exist. For example, a dammed metal master tool with the positive shape of the channel 42 could be used.

The stoppers 60, 62 each have grooves 68 on their sides that correspond to the grooves 54 on the sidewalls 46, 48 of the channel 42 in order to make a better seal. However, in some embodiments, this corresponding engaging structure may be omitted—the stoppers may be straight-sided, as may the channel 42.

The carrier 64 is an optional element in at least some embodiments. The purpose of the carrier is to support the channel 42 during filling. Particularly if the channel 42 is made of a soft, flexible material, it may bow outward or partially collapse during filling, which will impact the final shape of the encapsulated linear lighting 10. To prevent this, the carrier 64 has a slot 66 sized for the channel 42 and is made of a material stiff enough to support the channel 42 during filling. Of course, if the channel 42 itself is stiff enough to retain its shape during filling, it may not be necessary to use a carrier 64.

For ease in manufacturing, the carrier 64 may be made of the same material as a resin mold and in the same way, e.g., of cast or molded silicone resin. However, any material may be used as a carrier 64 so long as it will not adhere to the channel 42 or to any resin that might be spilled during filling. For example, machined wood, plastic, or metal may also be used. In some cases, additively manufactured (i.e., 3-D printed) carriers 64 may be used as well. If the material of the carrier 64 itself does not have a non-adherent property, it may be coated with a material that does, e.g., by spraying with a release agent. Although one slot 66 is shown in FIG. 2C, a carrier 64 may be wide, long, and have many slots 66, each one designed to accommodate a channel 42.

In seating the stoppers 60, 62 in the channel 42, the distal stopper 62 is seated in the conventional way—placed in the channel 42. However, the proximal stopper 60 is seated in a different way—it is pushed over the pins 17 of the connector 16 until the full extent of the pins 17, or nearly the full extent of the pins 17, lies within the stopper 60. In other words, the pins 17 of the connector 16 are at least partially sheathed within the proximal stopper 60. This may be done at any point once the connector 16 is installed; for example, the pins 17 of the connector 16 may be pushed into the stopper 60 before the strip of linear lighting 12 is installed within the channel 42.

Figure 3:
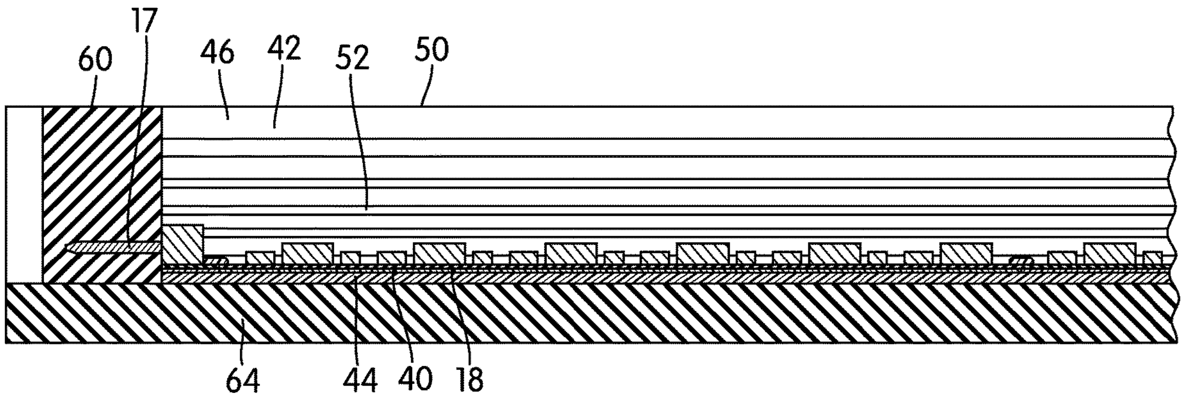
FIG. 3 is a longitudinal cross-section taken through Line 3-3 of FIG. 2C, illustrating the sheathing of the pin connector in a stopper in preparation for encapsulation.

The resulting position of the pins 17 within the stopper 60 is shown in particularly in FIG. 3, a longitudinal cross-sectional view taken through Line 3-3 of FIG. 2C. As shown, in this embodiment, the pins 17 extend as far into the stopper 60 as is practical, thus protecting them from the resin filling process and leaving their ends free from the encapsulation. This description—of penetrating the stopper 60 with the pins 17 and sheathing the pins 17 within the stopper 60—assumes that the stopper 60 is made of a soft rubber, such as a soft silicone rubber, and that the pins 17 are substantial enough that the force of sticking them into the stopper 62 will not cause damage.

If the pins 17 are thin and would bend or buckle from the insertion force, or if the material of the stopper 60 is too hard to allow for easy manual insertion, there are other options. For example, it is possible to build a stopper mold with openings for the pins 17 molded in, so that one can insert the pins 17 into openings molded for them, rather than forcing them to punch their own openings. U.S. Pat. Nos. 10,753,596 and 10,801,716 disclose a similar technique for making a stopper with an opening to pass a cord, and that technique may be used here. If molding a custom stopper is too much trouble, appropriately sized and spaced openings could be punched with an awl or another such tool, or by using the pins 17 of a connector 16 that is not attached to a strip of linear lighting 12 and can be sacrificed if the process destroys it. A stopper 60 may also be drilled or otherwise machined to create appropriate openings.

Figure 4:
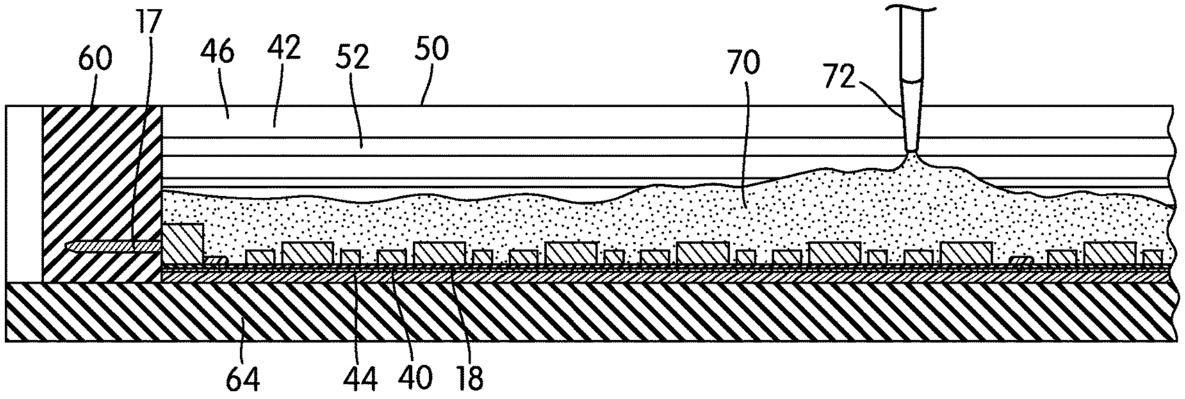
FIG. 4 is a cross-sectional view similar to the view of FIG. 3, illustrating the dispensing of resin into the channel.

Once the channel 42 is dammed with the pins 17 of the connector 16 sheathed and protected from resin, the channel 42 can be filled. This is shown in FIG. 4, a cross-sectional view similar to the view of FIG. 3. As was described above, the fill 70 is typically dispensed in liquid form by one or more nozzles 72. The fill 70 is usually a two-part resin, such as a two-part polyurethane or a two-part silicone, that is mixed prior to dispensing. For example, a two-part resin system may be mixed manually in the appropriate proportions, degassed, and poured into the dammed channel 42 to create the fill. However, the illustration of FIG. 4 assumes something else: a machine that automatically mixes a two-part resin system in the appropriate proportions and dispenses it in metered amounts. Some machines may hold the resin components under vacuum so as to avoid the need to degas the mixed resin. Some machines may have a translating dispensing head so that the nozzle or nozzles 72 move over the dammed channel 42 as material is dispensed. In other machines, the nozzle or nozzles 72 are stationary and the bed on which the channel 42 rests is moved. The DEMAK CV SMART line of dispensing machines (DEMAK Group, Torino, Italy) is one suitable option. This line of dispensing machines uses proprietary two-part polyurethane resins for channel 42 and fill 70.

While the above description focuses on two-part resins, the nature of the resin is not critical, and two-part resins are not the only options. For example, a single-part silicone resin that cures on exposure to atmospheric water vapor could be used, as could a single-part resin that cures in response to applied radiation, such as UV light, or light of a particular wavelength.

The filling operation shown in FIG. 4 may be done in one step, filling the channel 42 entirely, or in several steps. For example, it may be helpful to deposit a thin layer over the components on the PCB 18 and cure that layer before filling the entire channel. Depositing and curing a thin layer first may help to avoid bubble formation during heating. Of course, if bubbles do form, they can be popped or otherwise removed with a mechanical implement or by exposure to flame, e.g., a butane or propane torch, while the fill 70 is uncured. Filling in layers may also be useful if the fill 70 is a single-part resin that cures in response to atmospheric water vapor or applied radiation. Different types of fill 70 may be used in different layers. For example, an outer layer of fill 70 may include a light-diffusing additive.

Once the channel 42 is filled, or between layers of fill 70, the fill 70 is caused or allowed to cure. The phrase "caused or allowed" is used here to mean that in some circumstances, the resin may be caused to cure by, e.g., exposing it to elevated temperatures (e.g. 35-65° C.) or certain types of radiation (e.g., UV), while in other embodiments, a one- or two-part resin system will simply cure in ambient conditions, with no special action taken other than to allow it to do so. In many cases, a resin will cure in ambient conditions, but will cure faster if exposed to elevated temperatures. Some dispensing machines have motorized beds that can be shuttled into curing ovens or other curing devices. In those cases, causing the resin to cure may comprise moving the resin-bearing channels 42 into the curing ovens or other curing devices for some period of time.

After the resin is cured, the stoppers 60, 62 are removed, the now-encapsulated linear lighting 10 is removed from the carrier 64, and the process is complete.

As for the connector 16, the process described here has several advantages. For example, with this process, there is no need to accommodate a long length of cable during the process, nor is there a need to know what type of cable will be used prior to encapsulation. Any cable can be attached to the connector 16 after manufacture.

In the illustrated embodiment, the pins 17 of the connector 16 have the same pitch or spacing as the pitch of the set of solder pads 38. However, this need not be the case in all embodiments. If the solder pads 38 are spaced very closely together, it may be more convenient for the pins 17 of the connector 16 to be more spread out, in order to provide more space for connection to wires or conductors. In other words, a connector 16 may serve as a "breakout" for making electrical connections, in that its pins 17 or other connecting structure may be more widely spaced or otherwise easier to connect with than the solder pads 38 on the PCB 38.

Although a pin connector 16 is shown here, the connector may take other forms in other embodiments. That said, for increased throughput, it is helpful if the connector does not have features that would become trapped in a stopper 60.

Generally speaking, the stoppers 60, 62 may be reusable at least several times, particularly if the connector 16 is the same from production run to production run. However, that need not always be the case. For example, if necessary or desirable, a stopper 60 could be cut away from the connector 16, sacrificed either to ensure complete removal, or simply for convenience.

Figure 5:
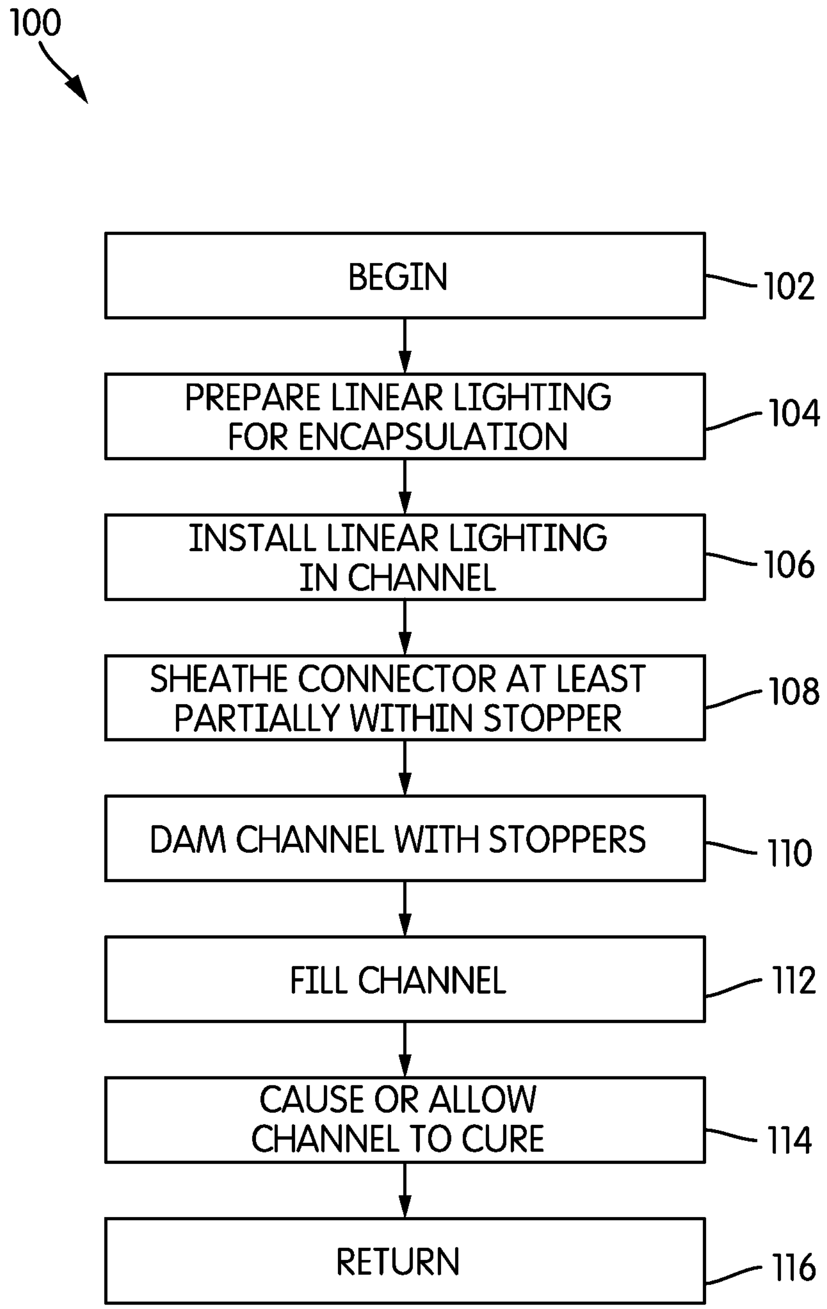
FIG. 5 is a schematic flow diagram summarizing the tasks involved in encapsulating a strip of linear lighting with a partially-encapsulated connector.

FIG. 5 is a flow diagram summarizing the manufacturing process, generally indicated at 100, that is described above. Process 100 begins at 102 and continues with task 104. In task 104, a strip of linear lighting 12 is prepared for encapsulation. This includes cutting the strip of linear lighting 12 to the desired length, attaching a connector 16 to a set of solder pads 38 and, optionally, attaching the strip of linear lighting 12 to a reinforcing member 40. Process 100 continues with task 106, and the prepared strip of linear lighting 12 is installed in a channel 42. In task 108, which may occur either before or after task 106, the pins 17 of the connector 16 are at least partially sheathed in a stopper 60. In task 110, the channel 42 is dammed by seating the stoppers 60, 62 in it. The channel 42 may optionally be placed in a carrier 64 to support it during filling. Process 100 then continues with task 112, in which the channel 42 is filled, and task 114, in which the channel 42 is caused or allowed to cure. As described above, that may occur by allowing the fill 70 to age in ambient conditions, or it may involve causing the fill 70 to cure by exposing the channel 42 and fill 70 to elevated temperatures, by exposing the channel 42 and fill 70 to radiation of particular wavelengths, etc. Process 100 concludes at task 116.

Process 100 assumes that two stoppers 60, 62 are used to dam a section of channel 42. However, that may not be the case in all embodiments or in all situations. In some cases, one end of the channel 42 itself may have a wall, endcap, or dam, making the use of a second, distal stopper 62 unnecessary.

Process 100 is but one basic example of the kinds of manufacturing processes that may be performed according to embodiments of the present invention. Processes according to embodiments of the invention need not include all of the steps of process 100. Overall, stoppers 60, 62 are versatile tools that allow for a wide variety of encapsulation processes and process variations. A connector 16 can be at least partially sheathed in a stopper 60 to shield it from resin fill 70 and keep it out of an encapsulation in many different processes.

For example, U.S. patent application Ser. No. 17/412,951, filed Aug. 26, 2021, which is incorporated by reference in its entirety, discloses processes for making a length of encapsulated linear lighting in segments. The processes disclosed in this patent application may be used with the techniques disclosed here. Briefly, this patent application discloses a technique that involves measuring out a desired length of linear lighting. That desired length may be long, and in some cases, longer than the bed or working area of the machine that is being used to dispense resin. Stoppers are specially molded so that they can be placed over the linear lighting PCB in the channel (i.e., they have negative impressions of at least some of the components on the PCB so that they fit tightly over the PCB and make a seal with both the PCB and the channel), and two stoppers, spaced from one another in proximal and distal positions along the linear lighting, are used to dam a segment of the channel for filling. When the two stoppers are set over the PCB in the channel, some unencapsulated linear lighting often extends beyond the distal stopper. The dammed segment of channel is filled, after which the distal stopper is removed from the channel and PCB and placed on the PCB some distance away from its former position to form a new segment for filling. When one runs out of channel, one places a new strip of channel so that it abuts the previous piece of channel, adheres the strip of linear lighting to it, and moves the stoppers to define another segment for filling. As segments of encapsulated linear lighting are filled and then caused or allowed to cure, the finished encapsulated linear lighting is removed from the carrier, if one is used, and coiled or otherwise stored away from the segment that is being filled.

The process 100 described here, and the use of a connector 16, may have particular advantages when used in a modified version of the process described in U.S. patent application Ser. No. 17/412,951. If a connector 16 is used and is sheathed in the proximal stopper 60 prior to filling of the first segment, it avoids the problem of having a potentially long cable to accommodate while one is making a long strip of encapsulated linear lighting.

Figure 6:
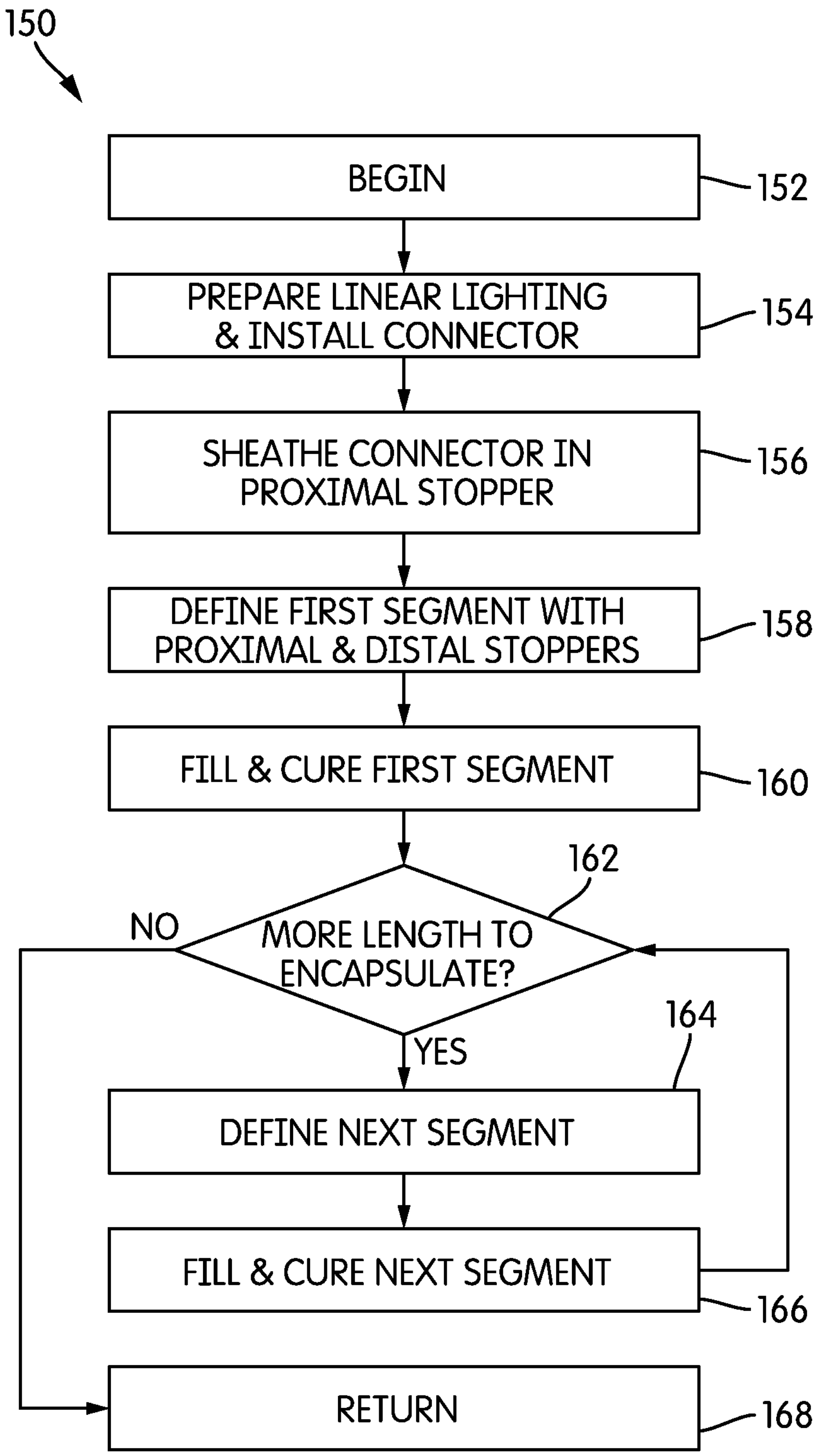
FIG. 6 is a schematic flow diagram of a related method for encapsulating a strip of linear lighting in segments with a partially-encapsulated connector.

More particularly, FIG. 6 is a flow diagram of a process, generally indicated at 150, for encapsulating a strip of linear lighting 12 with a connector 16 in segments. Process 150 begins at 152, and control passes to task 154. In task 154, a strip of linear lighting 12 is prepared for encapsulation. This typically involves cutting a strip of linear lighting 12 that is the entire desired length, even though it may be manufactured in several segments. Other preparation tasks include attaching a connector 16 and, optionally, a reinforcing member.

Process 150 continues with task 156. In task 156, the connector 16 is at least partially sheathed within a proximal stopper 60. This may be done, e.g., by penetrating the stopper with the pins 17 of the connector 16, or it may be done by inserting some portion of the connector into a negative, conforming opening that is molded or otherwise preformed into a stopper 60. As may be apparent from the description above, there is no absolute rule for how much of a connector 16 should be sheathed in the stopper 60, and thus, protected from the resin and the rest of the encapsulation process, but the portion of the connector 16 that is sheathed and protected, and thus exposed in the final product, should be sufficient to allow for electrical connections.

The order in which task 156 is performed may vary somewhat from implementation to implementation. That is, the connector 16 may be sheathed in the proximal stopper 60 before the strip of linear lighting 12 is placed in a channel 42, or it may be sheathed after the strip of linear lighting 12 is placed in a channel 42. For example, if the openings or other negative, conforming structure in the stopper 60 is already formed, it may be particularly easy to sheathe the connector 16 in the stopper 60 before installing the strip of linear lighting 12. However, in other cases, it may make more sense to sheathe the connector 16 in the stopper 60 after the strip of linear lighting 12 is in the channel.

In task 158, a segment of linear lighting is defined with stoppers and prepared for filling. This typically involves placing the strip of linear lighting 12 in a channel 42 and then placing a stopper or stoppers to dam the channel 42 at appropriate locations, as illustrated above. For the first segment produced, the proximal stopper 60 may have the same features described above. As relevant here, it may have a flat bottom and structure adapted to allow it to make a seal against the bottom of the channel 42. However, the distal stopper may be different than the proximal stopper. If the segment length is less than the total length of the strip of linear lighting 12, the distal stopper will typically be adapted to make a seal over the PCB and the channel. That is, the bottom surface of the stopper will be made with negative complementary impressions of one or more components on the PCB, so that the stopper can fit over and make a seal against the PCB and the channel walls.

Once a segment is defined in task 158, that segment is filled and cured, as shown in task 160. In a process like process 150, for reasons that will be described below in more detail, a carrier like the carrier 64 described above is frequently used during the filling and curing tasks.

After the first segment is filled, process 150 continues with a decision: if there is more length of linear lighting 12 to encapsulate (task 162: YES), process 150 continues with task 164. If the entire strip of linear lighting 12 has been encapsulated (task 162: NO), process 150 terminates at task 168.

In task 164, the next segment is defined for filling and curing. This may happen in one of several ways. In one case, a segment is defined between the encapsulated end of the last segment and a distal stopper installed overtop of the strip of linear lighting 12 in the same channel 42. In another case, it is necessary to add another piece of channel 42 abutting the last piece of channel 42, install the linear lighting in the new piece of channel 42, and then form a segment between the encapsulated end of the last segment and a distal stopper installed over the strip of linear lighting 12 in the new piece of channel. It is also possible that, in defining the next segment, one might use two stoppers. This may be the case if, for example, one is making multiple short lengths of encapsulated linear lighting in the same channel, e.g., in the way of U.S. Pat. No. 10,753,596. In that case, the next segment of linear lighting may have a connector 16, and the proximal stopper 60 may sheathe at least a portion of that connector.

Process 150 continues in task 166, in which the defined next segment is filled and caused or allowed to cure. For the reasons explained above, a carrier 64 is frequently used in task 166. Carriers 64 may be particularly helpful in situations in which defining the next segment in task 164 involves introducing a new piece of channel 42 abutting the channel 42 of the previous segment. Because there is no physical connection between the sidewalls 46, 48 of the two abutted channels 42, doing this introduces a small open discontinuity, and when the segment is filled, resin may leak out of that discontinuity. However, if the two abutted channels 42 lie within the slot 66 of a carrier 64, the walls of the slot 66, fitted tightly against the sidewalls 46, 48 of the channel 42, will prevent much of the potential leakage. Once the segment is filled and caused or allowed to cure, control of process 150 returns to task 162 until the length of the strip of linear lighting 12 has been completely encapsulated and there are thus no further segments to define or fill.

Process 150 provides a further example of how the technique of sheathing at least a portion of a connector 16 in a stopper 60 may be used. Yet there are other potential variations.

For example, in the United States, it is common to power a strip of linear lighting 12 from only one end. This means that, in most cases, there will be only one connector 16 at one end of the strip of linear lighting 12. This is done largely because of electrical safety codes. However, it is possible to power a strip of linear lighting 12 from both of its proximal and distal ends, or from multiple points along the strip. If that is to be done, e.g., connectors would be connected to solder pads 38 on both ends of the strip of linear lighting 12, and each connector would be sheathed in a stopper 60. If a connector 16 must be placed in the middle of a PCB 18, the stopper may be molded to have impressions of at least some of the components on the PCB 18 around that location, so that it can fit snugly overtop of the PCB 18.

The end of processes like processes 100 and 150 may represent the end of the manufacturing process as a whole. However, in many embodiments, there will be additional steps. At the conclusion of processes 100, 150 like those described above, the encapsulated linear lighting 10 has been created. Such encapsulated linear lighting 10 may be kept in stock, if desired.

When it comes time to connect the encapsulated linear lighting 10 to power, a complementary connector may be used. For example, a female connector may be inserted over the male pins 17 of the connector 16. This kind of connection may be sufficient when a high ingress protection rating is not required, e.g., if the major threat is dust and large particulates, or if the encapsulation is mostly needed to protect the strip of linear lighting 12 from bending too much or in the wrong way.

However, more often than not, a high IP rating is desirable, e.g., to protect the strip of linear lighting 12 from pressurized water or long-duration immersion. In that case, the connection between the connector 16 and power is usually also encapsulated, unless the particular application or installation is such that the connection to power can be made away from environmental hazards.

Encapsulating a connection can be done by a variety of methods. Overmolding with a vertical injection molder using a thermoplastic material compatible with the encapsulation resin is one such method. That said, an injection molder is another piece of equipment to be acquired and maintained. Thus, in at least some cases, the encapsulation of the connection (i.e., overmolding the connection) may be done with the same sort of poured-resin equipment and processes used to create the encapsulated linear lighting 10.

Figure 7:
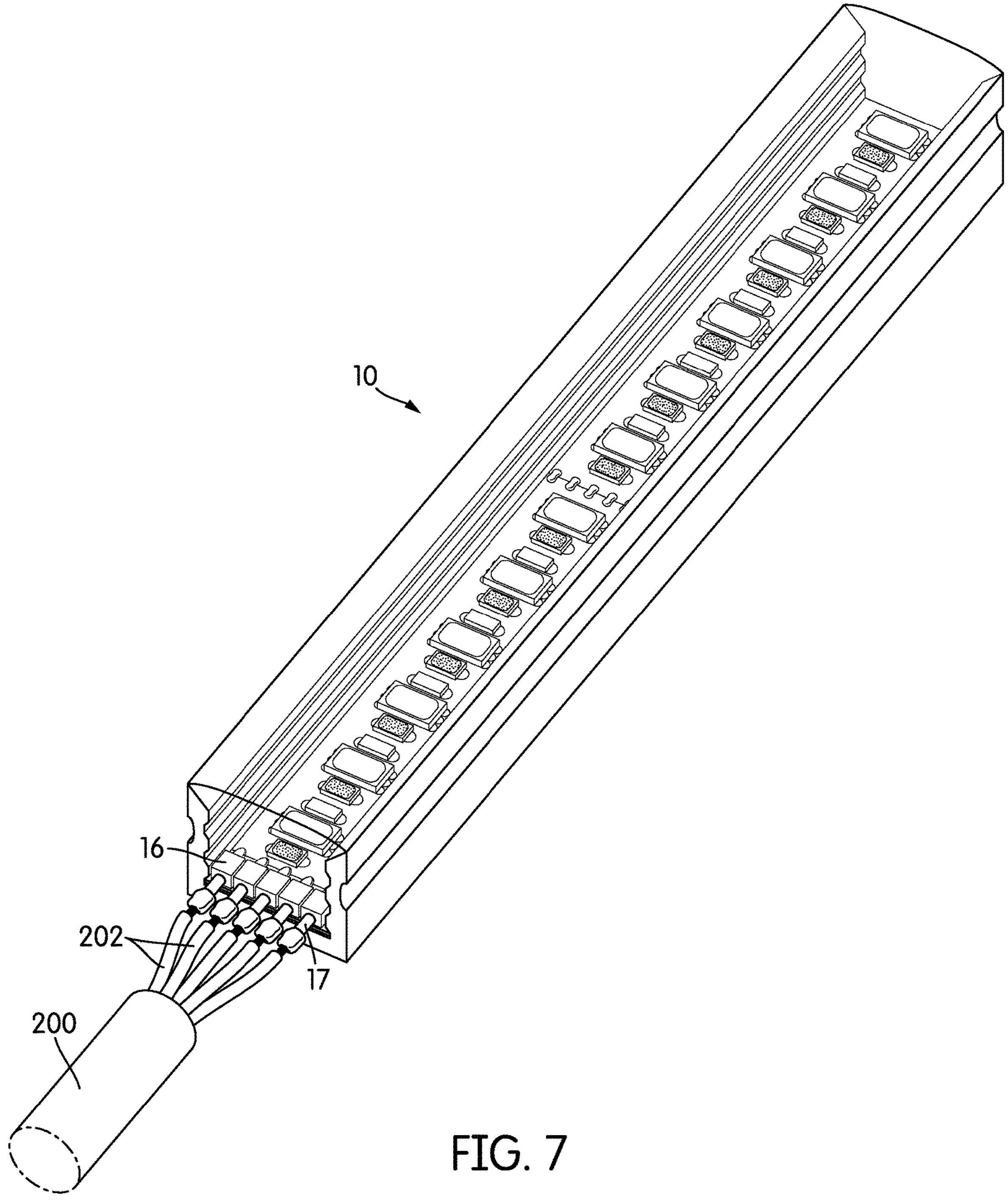
FIG. 7 is a perspective view of the strip of encapsulated linear lighting of FIG. 1 with a cable and conductors attached to the partially-encapsulated connector.

FIG. 7 is a perspective view illustrating an opening step in a process of overmolding or encapsulating the connection between the pins 17 of a connector 16 and a cable 200 having a number of conductors 202. In the view of FIG. 7, the conductors 202 have already been soldered to respective pins 17 of the connector 16. In other cases, the conductors 202 may be connected to the connector 16 in some other fashion, e.g., by a connector.

Figure 8:
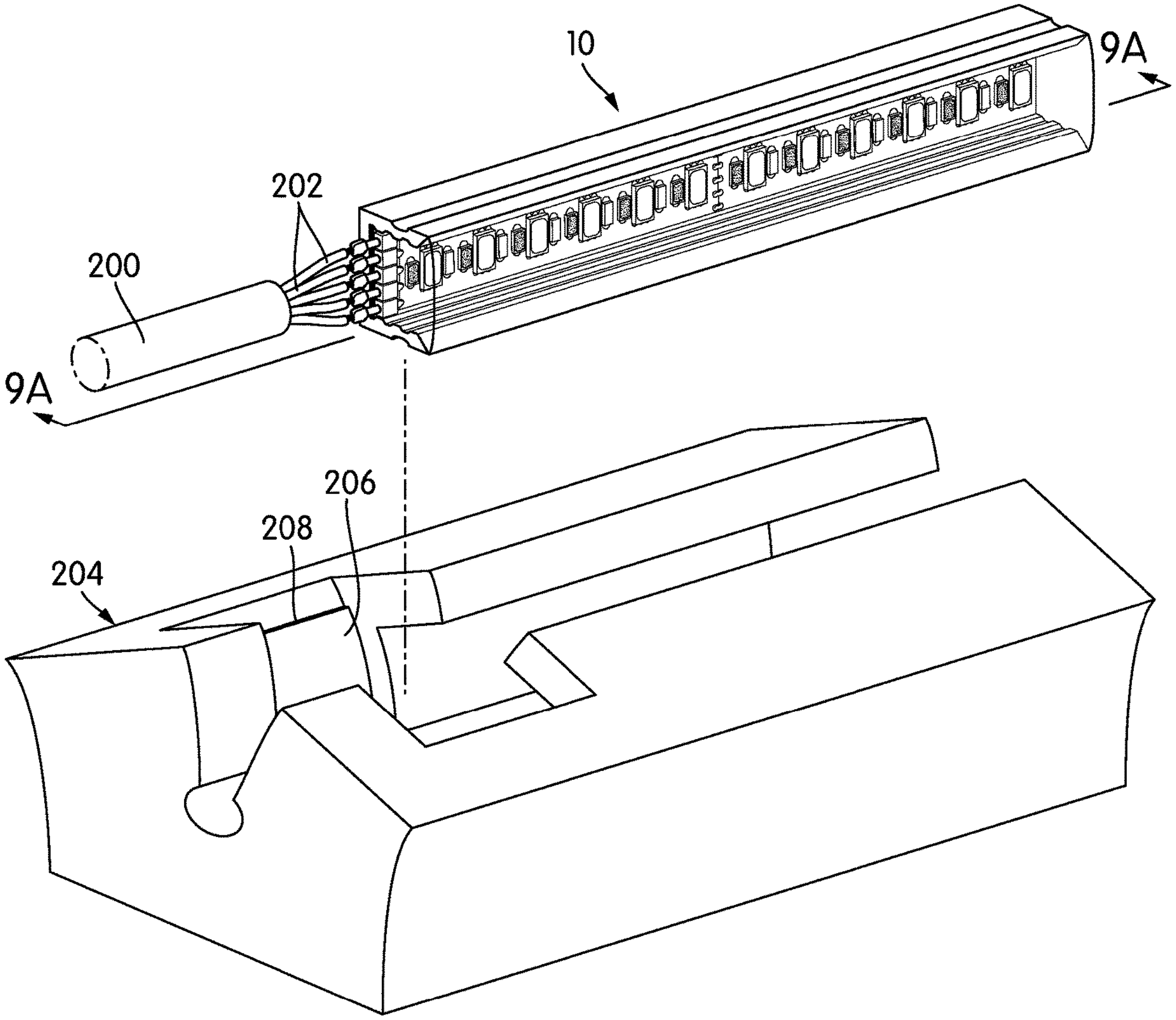
FIG. 8 is an exploded perspective view illustrating the insertion of the strip of encapsulated linear lighting of FIG. 7 into a mold for overmolding of the connection between the conductors of the cable and the partially-encapsulated connector.

FIG. 8 is a perspective view illustrating the next task in an overmolding encapsulation process. The assembly including the encapsulated linear lighting 10 and the cable 200 is placed in a mold 204 for overmolding. The mold 204 has a cavity 206 that is a negative of the encapsulated linear lighting 10 and the cable 200. In this particular embodiment, the cavity 206 is structured to accept the encapsulated linear lighting 10 and the cable 200 when the encapsulated linear lighting 10 is placed on its side, although the orientation may vary in other embodiments.

Figure 9A:
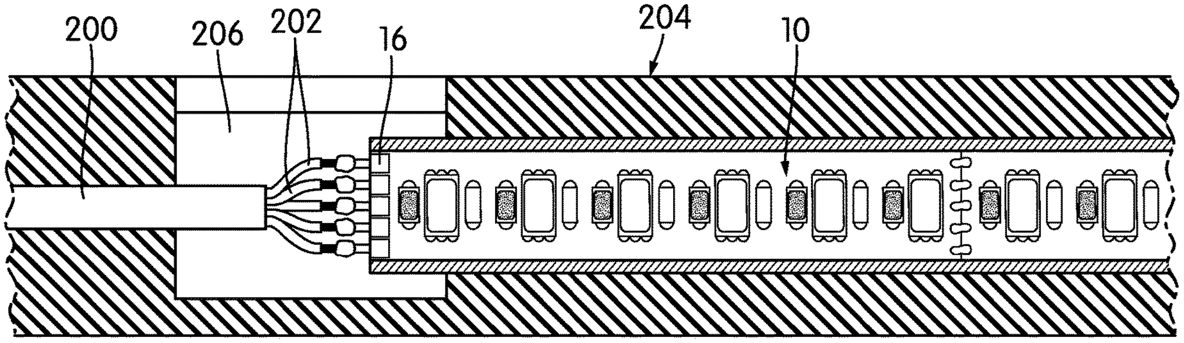
FIG. 9A is a longitudinal cross-section taken through Line 9A-9A of FIG. 8, illustrating the placement of the strip of encapsulated linear lighting in the mold.

As can be seen in FIG. 8 and in FIG. 9A, a cross-section taken through Line 9A-9A of FIG. 8, the cavity 206 is of varied internal shape. It fits tightly over all but a small portion of the encapsulated linear lighting 10 and all but a small portion of the cable 200, thus preventing poured resin from flowing freely along the entire length of the encapsulated linear lighting 10 or over the rest of the cable 200. However, around the area of the joint, the shape of the cavity 206 is that of a rectangular prism, and that rectilinear shape will be the shape of the finished overmold. For the convenience of the operator, the cavity 206 has a ledge 208 below the top of the cavity 206 as a visual indicator of where filling should stop. Notably, the cavity 206 is also open along its top face. The open cavity 206 may help to allow air entrained in the resin to escape during filling and curing.

A mold 204 of this type is usually made with a mandrel or mock-up that has the positive shape and dimensions of the encapsulated linear lighting 10 and the shape and dimensions of the cable 200. In assembling such a mandrel or mock-up, for example, metal rod of appropriate diameter can be used to simulate the cable 200. The encapsulated linear lighting 10 can also be simulated by a metal piece of the same shape as the encapsulated linear lighting 10.

In some cases, actual strips of encapsulated linear lighting 10 may be used to create the mold 204. When using actual encapsulated linear lighting in mold-making, there are some special considerations. Specifically, the present inventor has found that the conventional channel-filling process may warp or distort the shape of the encapsulated linear lighting 10 slightly in ways that have little bearing on usability but can prevent the encapsulated linear lighting 10 from having the precise shape needed for the mold 204. For this reason, some types of encapsulated linear lighting may be more suitable than others for mold-making. In particular, U.S. patent application Ser. No. 17/732,760, filed Apr. 29, 2022 and incorporated by reference herein in its entirety, discloses the use of a pre-cured air gap member to fill much of a channel during encapsulation. Because much of the fill in this type of linear lighting is pre-cured before insertion into the channel, with only a thin layer of in-channel cured resin overtop, this particular form of encapsulated linear lighting may experience less warping or distortion during the encapsulation process. For that reason, if actual linear lighting is used to make the mold 204, this form of encapsulated linear lighting may be particularly suitable.

Figure 9B:
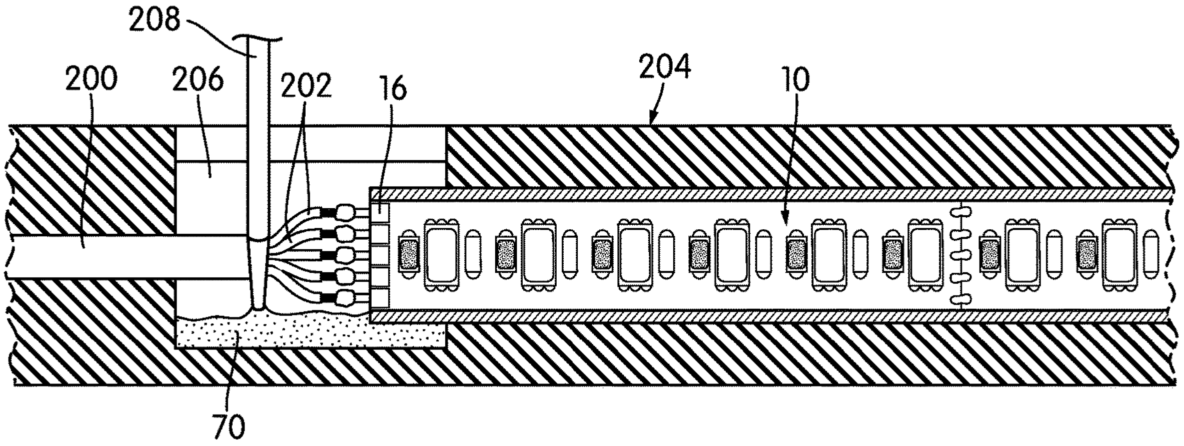
FIG. 9B is a cross-sectional view similar to the view of FIG. 9A, illustrating the filling of the mold with resin.

Returning to the overmolding process, FIG. 9B is a cross-sectional view similar to the view of FIG. 9A, illustrating the filling of the cavity 206. This may be done by a resin dispensing machine of the type described above, or it may be done manually, e.g., by dispensing mixed and degassed resin from a syringe. If the cavity 206 includes a ledge 208, or another such indicating feature, filling may stop at the point indicated by that feature. As shown in FIG. 9B, the filling of the cavity 206 is often done by inserting the needle or nozzle 208 as far into the cavity 206 as possible and filling from the bottom up. The resin 70 is then caused or allowed to cure in the same way as described above. Here, the resin 70 is assumed to be the same, or about the same, as the resin 70 used to make the channel 42 and to fill the channel 70. However, the resin 70 used in overmolding may have different additives (e.g., colorants or opaque additives), or it may be of a different type altogether.

FIG. 10 illustrates the finished piece, with the pins 17 and conductors 202 covered by an overmold 210. As was noted briefly above, and as can be seen in FIG. 10, the overmold 210 is a rectangular prism in the illustrated embodiment but may have various other shapes in other embodiments. The overmold 210 is expected to provide high ingress protection and a high ingress protection rating. It may also serve as electrical insulation for the connection between the cable 200 and the encapsulated linear lighting 10.

In the foregoing description, it was assumed that the connector 16 connects the encapsulated linear lighting 10 to power by allowing it to connect with an appropriate cable 200. However, that need not be the case in all embodiments; rather, a connector 16 can facilitate electrical connections to anything. One possible variation is shown in the perspective view of FIG. 11. In the view of FIG. 11, there are two strips of encapsulated linear lighting 10, each of which has a partially encapsulated connector 16. The strips of encapsulated linear lighting 10 are connected end-to-end by conductors 302, which may be of any length, attached to the respective connectors 16.

Arrangements like the one in FIG. 11 may be particularly useful in creating flexible joints between strips of encapsulated linear lighting 10. If the conductors 302 and their connections with the connectors 16 need protection, a variety of techniques can be used, including heat shrink wrap, resin pour-over, and the kinds of overmolding described above. Although the conductors 302 shown in FIG. 11 are substantially straight, connectors 302 may be flexible, or pre-shaped with a curve or a right-angle bend.

While the invention has been described with respect to certain embodiments, the description is intended to be exemplary, rather than limiting. Modifications and changes may be made within the scope of the invention, which is defined by the appended claims.

What is claimed is:

1. A method, comprising:

attaching connecting structure to a strip of linear lighting;

sheathing a portion of the connecting structure in a stopper;

installing the strip of linear lighting in a vessel;

damming at least a portion of the vessel with the stopper; and filling the vessel with a resin to create an encapsulated strip of linear lighting.

2. The method of claim 1, wherein the vessel comprises a channel.

3. The method of claim 2, wherein said damming comprises installing the stopper at a first location within the channel and installing a second stopper at a second location within the channel, spaced from the first location.

4. The method of claim 3, further comprising causing or allowing the resin to cure.

5. The method of claim 4, further comprising:

defining a second segment for encapsulation by placing the second stopper or another stopper at a position along the channel spaced from the cured resin;

filling the second segment with the resin; and causing or allowing the resin of the second segment to cure.

6. The method of claim 1, wherein the connecting structure comprises a pin connector.

7. The method of claim 1, wherein the strip of linear lighting comprises a printed circuit board (PCB) and one or more LED light engines mounted on the PCB.

8. The method of claim 1, wherein said attaching comprises soldering the connecting structure to solder pads of the PCB.

9. The method of claim 1, further comprising:

connecting an exposed portion of the connecting structure to a conductor or conductors; and overmolding the connection between the connecting structure and the conductor or conductors.

* * * * *